No. 783,754. PATENTED FEB. 28, 1905.
E. L. McCLAIN.
HARNESS PAD FOR HORSES.
APPLICATION FILED JUNE 13, 1902.

Witnesses
C. W. Miles.
C. A. Lehmkuhl.

Inventor
Edward L. McClain
By Murray & Murray
Attorneys

No. 783,754.　　　　　　　　　　　　　　　　　　Patented February 28, 1905.

UNITED STATES PATENT OFFICE.

EDWARD L. McCLAIN, OF GREENFIELD, OHIO, ASSIGNOR TO THE AMERICAN PAD & TEXTILE COMPANY, OF GREENFIELD, OHIO, A CORPORATION OF OHIO.

HARNESS-PAD FOR HORSES.

SPECIFICATION forming part of Letters Patent No. 783,754, dated February 28, 1905.

Application filed June 13, 1902. Serial No. 111,458.

*To all whom it may concern:*

Be it known that I, EDWARD L. McCLAIN, a citizen of the United States of America, and a resident of Greenfield, county of Highland, and State of Ohio, have invented certain new and useful Improvements in Harness-Pads for Horses, of which the following is a specification.

The object of my invention is a horse-pad having edges which when the pad is placed beneath the harness renders the pad waterproof, while at the same time preserving its flexibility, causes it to remain in place more firmly, heightens the ornamental appearance of the pad, and reinforces it in the places most subject to wear from the lines and traces. This object is attained by the means described in the specification, specifically pointed out in the claims, and illustrated in the accompanying drawings, in which—

Figure 1:
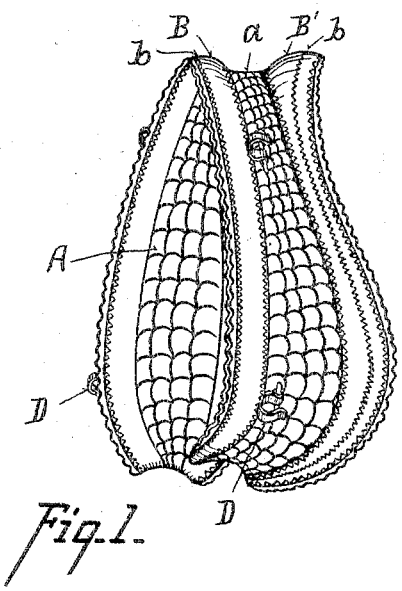
Figure 2:
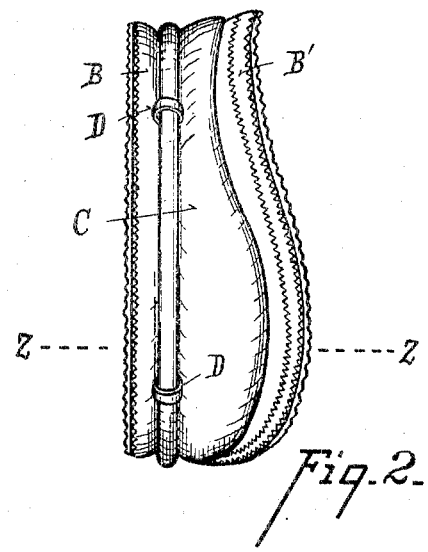
Figure 4:
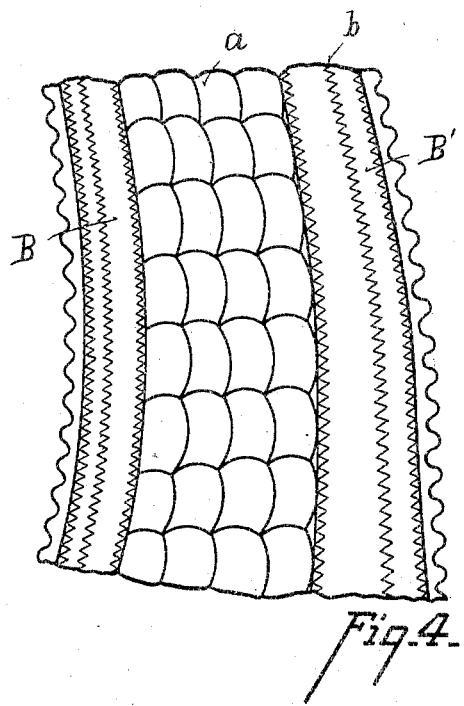
Figure 3:
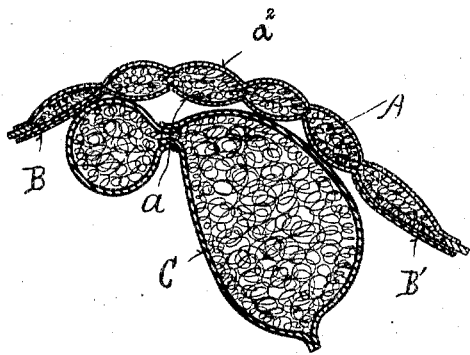

Figure 1 is a perspective view of a collar-pad embodying my invention. Fig. 2 is a side elevation of the same with a collar placed thereon. Fig. 3 is a cross-section taken upon line $z\ z$ of Fig. 2 upon an enlarged scale. Fig. 4 is an enlarged detail view of a section of the pad.

Referring to the parts, pad A is of the same general shape and nature as stuffed collar-pads now in use, my invention relating to the edges thereof. Upon the outer surface—that is, the surface which does not come in contact with the animal's neck—are placed strips B and B' of waterproof material along the front and rear edges of the pad. The waterproof material is preferably a glazed or enameled cloth and is secured upon the pad by rows of ornametal stitching $b$, which may be made in a zigzag form, as shown, or in any other ornamental style, and is made, preferably, of colored thread.

Strips B and B' are placed at a distance apart equal to the width of the collar C which is to be placed upon the pad, so that when the collar rests upon the pad the porous surface $a$ of the pad between the strips is covered by the collar, which is held in place by the usual hooks D, secured to the pad.

It is obvious that when the pad and collar are placed upon an animal, the edges being waterproof and the porous part of the pad being covered by the collar, the pad will be entirely waterproof, that the waterproof edge not coming in contact with the horse the interior $a^2$ of the pad retains its absorbent qualities, that the waterproof material extending as it does over only part of the surface does not impair the flexibility of the pad, and the collar resting upon the non-porous material with the waterproof material upon either side will tend to remain more firmly in place than with the ordinary pad, that the waterproof material coming at points where the reins and the traces pass over the pad will reinforce it at those points against the wear, so that the stuffing does not become exposed, and that this waterproof material, with the conspicuous stitching, is of a highly ornamental character.

While I have illustrated my invention as applied to a collar-pad, it is obvious that the same is equally applicable to other characters of horse-pads, such as gig-saddle and breast-collar pads, &c., and I therefore do not wish to be limited to a horse-collar pad; but

What I claim is—

1. A pad for horses having strips of waterproof material secured upon the outer surface of the same near its front and rear edges by rows of ornamental stitching leaving a strip of porous material between the waterproof strips in combination with a piece of harness of a width such as to fit over the strip of porous material, substantially as shown and described.

2. A horse-collar pad having secured upon its edges, front and rear, strips of waterproof material leaving between them a strip of porous material, in combination with a horse-collar to rest upon the porous material, substantially as shown and described.

EDWARD L. McCLAIN.

Witnesses:
C. L. LAWHEAD,
M. E. LILE.